United States Patent [19]
Pidgeon et al.

[11] Patent Number: 5,523,880
[45] Date of Patent: Jun. 4, 1996

[54] PROJECTION SCREEN MASKING SYSTEM

[75] Inventors: John D. Pidgeon; David Manthei, both of New Castle, Ind.

[73] Assignee: Draper Shade & Screen Co., Inc., Spiceland, Ind.

[21] Appl. No.: 281,235

[22] Filed: Jul. 27, 1994

[51] Int. Cl.[6] .................................................. G03B 37/00
[52] U.S. Cl. .............................................. 359/450; 355/74
[58] Field of Search ................................. 355/74; 359/450

[56] References Cited

U.S. PATENT DOCUMENTS

| | | |
|---|---|---|
| 1,857,368 | 5/1932 | Flynn et al. . |
| 1,857,673 | 5/1932 | Vallen . |
| 1,882,828 | 10/1932 | Hall et al. . |
| 2,737,081 | 3/1956 | Dowling . |
| 3,016,790 | 1/1962 | Nakamatsu . |
| 3,475,086 | 10/1969 | Vetter ........................................ 352/69 |
| 4,312,568 | 1/1982 | Weinberg ................................. 350/117 |
| 4,754,308 | 6/1988 | Ozawa ....................................... 355/74 |
| 4,915,496 | 4/1990 | Stine ........................................ 352/69 |
| 5,121,977 | 6/1992 | Weisgerber .............................. 359/450 |

*Primary Examiner*—David M. Gray
*Assistant Examiner*—Daniel P. Malley
*Attorney, Agent, or Firm*—Baker & Daniels

[57] ABSTRACT

A masking apparatus for masking portions of the viewing surface of a projection screen. The masking apparatus includes an upper roller, upon which is wound an upper masking screen, and a lower roller, upon which is wound a lower masking screen operatively connected to the upper roller. When the upper roller is rotated in a first direction, the upper masking screen is unwound and lowered to mask the upper region of the screen and the lower masking screen is unwound and raised to mask the lower region of the screen. When the upper roller is rotated in an opposite second direction, the upper and lower masking screens are wound to non-masking alignments. In an alternate embodiment, the masking apparatus can be used to mask side regions of a projection screen viewing surface.

13 Claims, 6 Drawing Sheets

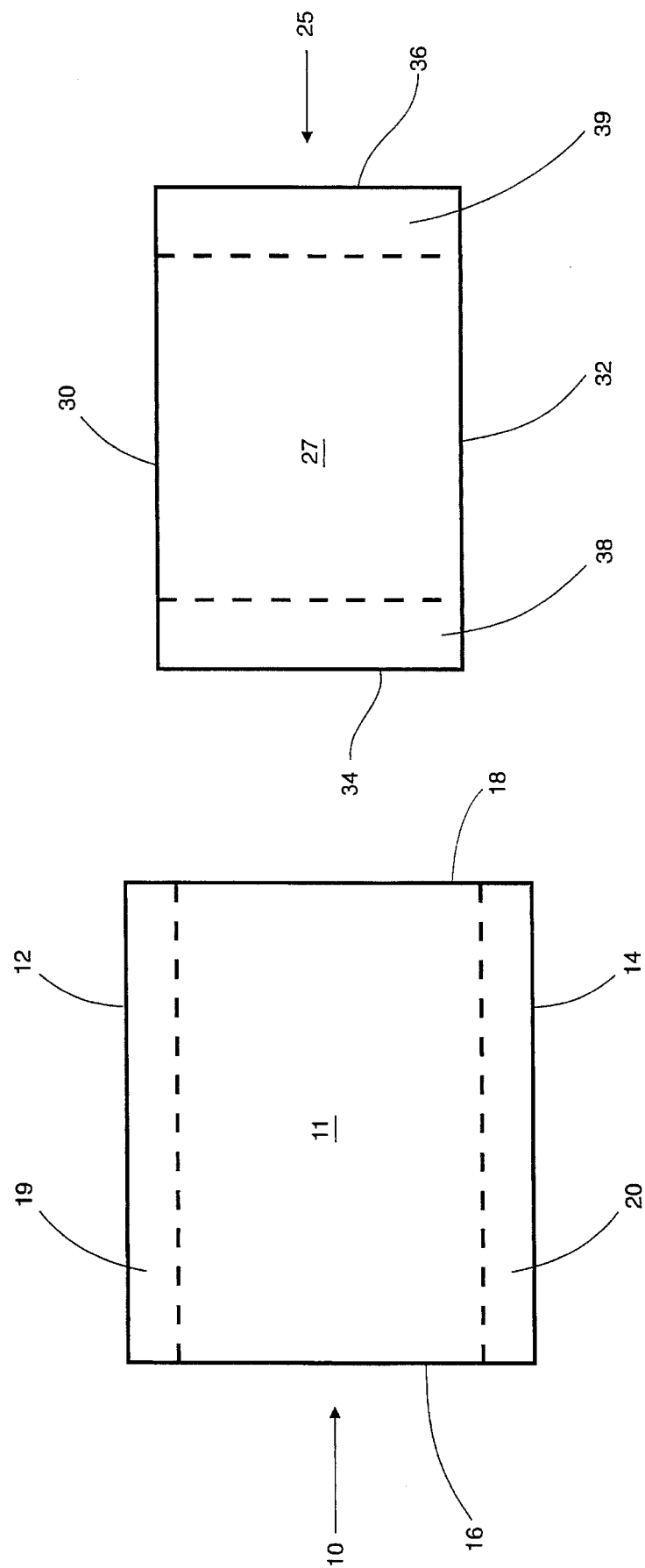

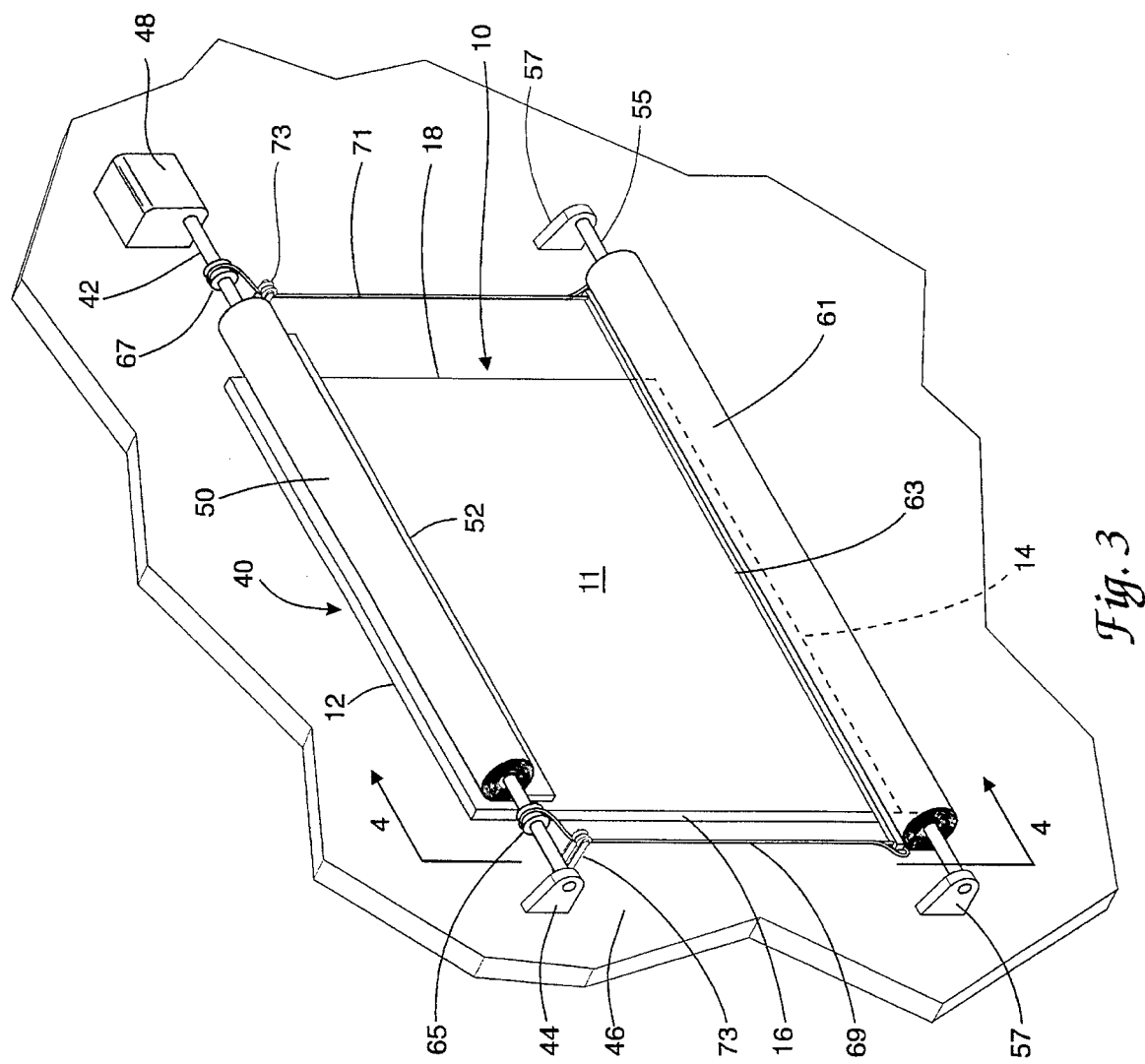

PROJECTION SCREEN MASKING SYSTEM

BACKGROUND OF THE INVENTION

This invention pertains to projection screens, and, in particular, to a masking apparatus for a projection screen which masks border regions of the projection screen to adjust the dimensions of the viewing surface of the screen.

Projection screens in various forms are being utilized in a variety of venues, including conference rooms and home entertainment systems. On occasion, a projection screen which is appropriately dimensioned for one particular use may be used in a manner which results in portions of the projection screen being superfluous. For example, a single video projection screen provided with a rectangular viewing surface may be called upon for use with different video formats such as normal video projection and high definition television (HDTV). Normal video production has a 3:4 format, meaning the total height of the image projected on the viewing surface is three-quarters of the total width. On the other hand, HDTV utilizes a 9:16 format. Consequently, for video projection screens appropriately sized for a specific one of these formats, these screens will include exposed but unused portions of the viewing surface when utilized with the other format. Thus, to properly frame the projected image, it is desirable to provide a masking apparatus which temporarily masks or covers those portions of the viewing surface of a projection screen upon which no image is to be projected.

A variety of known masking systems have been utilized to mask various regions of projection screens. While some systems have been adequate from the standpoint of successfully covering a particular region of a projection screen, these systems suffer from an assortment of shortcomings. For instance, while a variety of systems have advantageously utilized a single motor to mask multiple borders of a projection screen, typically complex linkages which complicate construction have previously been employed. Another shortcoming relates to the relatively large amount of space occupied by the masking system. In a variety of systems in which an upper region of a projection screen was masked, the masking curtains were suspended from linkages above the curtains. Furthermore, the masking curtains were raised from a masking orientation in accordion fashion or entirely as a panel. As a result, the vertical profile of the system was increased. A known masking system has also attempted to mask the side regions of a viewing surface with curtains which, when not in a masking orientation, were wound around a vertically oriented roller. However, as masking curtains or fabrics may not roll up well around vertically oriented rollers, the performance of these types of masking system may suffer. Thus, it is desirable to provide a masking system for a projection screen which is free from these shortcomings.

SUMMARY OF THE INVENTION

In one form thereof, the present invention provides a masking apparatus for use with a projection screen having a viewing surface including an upper region, a middle region, and a lower region. The masking apparatus includes an upper roller positioned above the viewing surface middle region, an upper masking screen for masking the upper region of the viewing surface, wherein the upper masking screen is windable around the upper roller, means for rotating the upper roller in both a first direction to unwind the upper masking screen from around the upper roller to a masking alignment and in a second direction to wind the upper masking screen around the upper roller to a non-masking alignment, a lower masking screen for masking the lower region of the viewing surface, wherein the lower masking screen is raiseable to a masking alignment and lowerable to a non-masking alignment, and at least one connector means, operatively interconnecting the rotating means and the lower masking screen, for moving the lower masking screen when the upper roller is rotated. The lower masking screen moves toward the masking alignment when the upper roller rotates in the first direction, and the lower masking screen moves toward the non-masking alignment when the upper roller rotates in the second direction.

In another form thereof, the present invention provides a masking apparatus for use with a projection screen having a viewing surface including an upper region, a middle region, and a lower region and the masking apparatus includes an upper roller positioned above the middle region, and an upper masking screen for masking the viewing surface upper region. The upper masking screen is windable around the upper roller in a first wrapping direction. The masking apparatus also includes a lower roller positioned below the middle region, a lower masking screen for masking the viewing surface lower region, wherein the lower masking screen is windable around the lower roller, at least one strap windable around the upper roller in a second wrapping direction, the at least one strap extending downwardly from the upper roller and operatively connected to the lower masking screen, and means for rotating the upper roller in a first direction and a second direction. The upper masking screen unwinds from the upper roller and the at least one strap winds around the upper roller when the upper roller is rotated in the first direction, such that the upper masking screen is lowered to mask the viewing surface upper region and the lower masking screen is raised to mask the viewing surface lower region. The upper masking screen winds around the upper roller and at least one strap unwinds from around the upper roller when the upper roller is rotated in the second direction, whereby the upper masking screen is raised to unmask the viewing surface upper region and the lower masking screen is lowered to unmask the viewing surface lower region.

In still another form thereof, the present invention provides a masking apparatus for use with a projection screen having a viewing surface including a middle region and opposing side regions. The masking apparatus includes an upper roller means, a first side masking screen for masking one viewing surface side region, wherein the first side masking screen is windable around the upper roller means, a second side masking screen for masking the other viewing surface side region, wherein the second side masking screen is windable around the upper roller means, and means for rotating the upper roller means in a first direction and a second direction. The first side masking screen and the second side masking screen unwind from the upper roller means when the upper roller means is rotated in the first direction such that the first side masking screen and the second side masking screen are lowered to mask the viewing surface side regions. The first side masking screen and the second side masking screen wind around the upper roller means when the upper roller means is rotated in the second direction such that the first side masking screen and the second side masking screen are raised to unmask the viewing surface side regions.

An advantage of the masking apparatus of the present invention is that it provides for the masking of upper and lower regions, or opposite side regions, of a video projection screen with a single motor. Another advantage of the masking apparatus of the present invention is that it has a low profile when arranged in a non-masking alignment. Still another advantage of the masking apparatus of the present invention is that complicated and potentially expensive linkages are not required to effectively mask opposite border regions of a projection screen.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein:

FIG. 1 is a front view of a video projection screen dimensioned for normal video projection, wherein masking of upper and lower screen regions resulting in a viewing surface dimensioned for high definition television are shown in shadow.

FIG. 2 is a front view of a video projection screen dimensioned for high definition television, wherein masking of side regions providing a viewing surface dimensioned for normal video projection are shown in shadow.

FIG. 3 is a perspective view of an embodiment of the masking apparatus of the present invention used to mask upper and lower regions of a shown projection screen, wherein the masking apparatus is shown in a non-masking or raised alignment.

Figure 4:
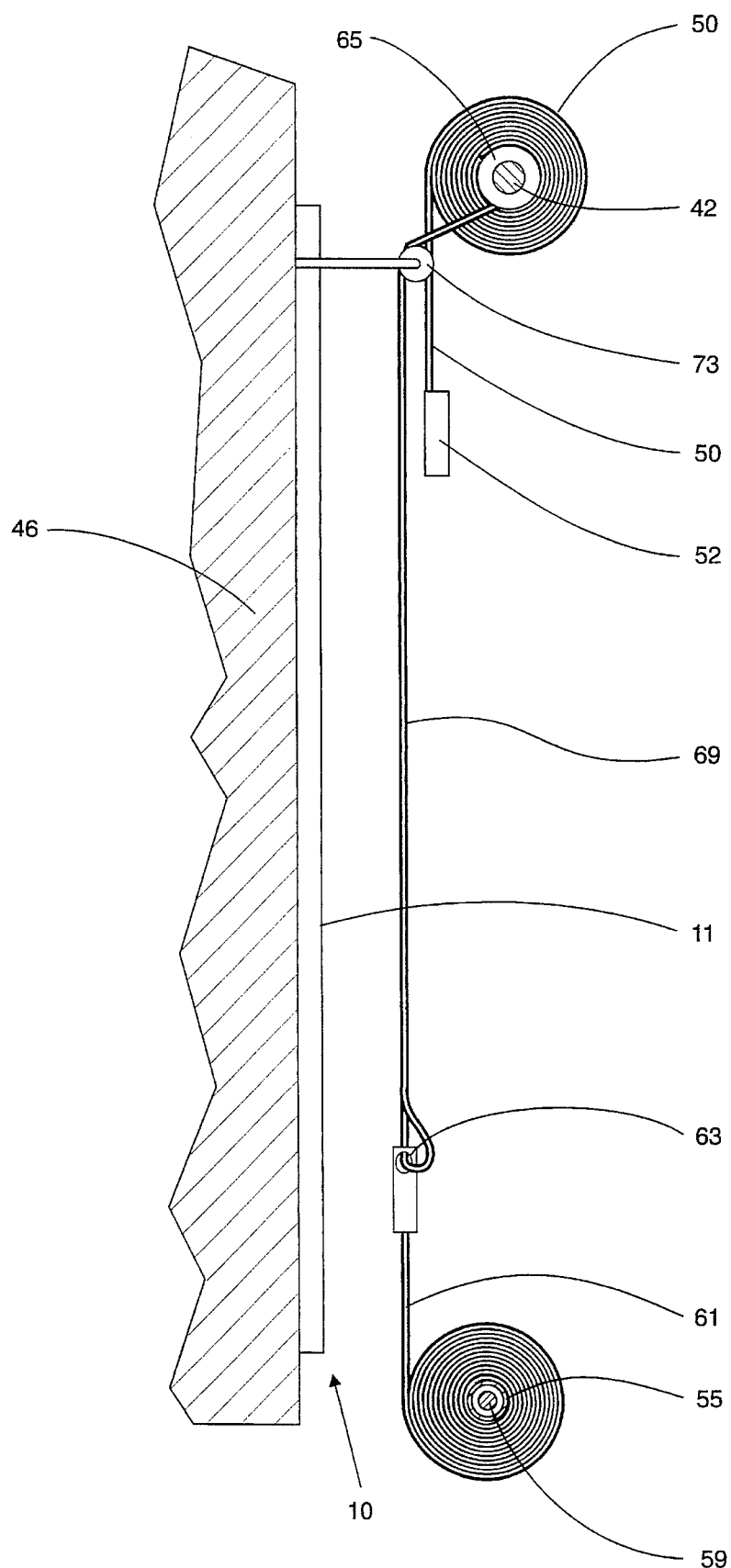
FIG. 4 is a cross-sectional side view, taken along the line 4—4 in FIG. 3, of the masking apparatus of FIG. 3 in the process of being moved to a masking alignment.

Corresponding reference characters indicate corresponding parts throughout the several views. Although the drawings represent embodiments of the invention, the drawings are not necessarily to scale and certain features may be exaggerated in order to better illustrate and explain the present invention. The exemplifications set out herein illustrate embodiments of the invention and such exemplifications are not to be construed as limiting the scope of the invention in any manner.

DESCRIPTION OF THE PREFERRED EMBODIMENTS

In FIGS. 1 and 2, there are shown, in abstract, different ways of using masking systems or apparatuses to convert projection screens into different sized viewing formats. In FIG. 1, there is shown a front view of a projection screen 10 suitable for video projection. Projection screen 10 includes a rectangular front viewing surface 11 defined by top border or edge 12, bottom border 14, and opposite side borders 16, 18. Projection screen 10 is dimensioned for a normal video projection format, and according to convention the screen height is three-quarters of the screen width. For instance, the length of side borders 16, 18 is six feet while the length of top border 12 and bottom border 14 is eight feet. An arrangement of projection screen 10 for use with high definition television is shown in shadow. Specifically, strips of masking fabric 19, 20 are shown masking nine inch high segments of the upper region and lower region of viewing surface 11, respectively, thus reducing the effective viewing length of the side borders by one and one-half feet to a length of four and one-half feet. As a result, the exposed middle region of viewing surface 11 is properly sized in the conventional 9:16 format utilized with HDTV.

In FIG. 2, projection screen 25 is particularly dimensioned for high definition television, and therefore the screen height is nine-sixteenths of the screen width. Projection screen 25 includes a rectangular front viewing surface 27 upon which images are projected or displayed. Viewing surface 27 is defined by top border 30, bottom border 32, and opposite side borders 34, 36. An arrangement of projection screen 25 for use with normal video projection is shown in shadow. Strips of masking fabric 38, 39 are shown masking side regions of viewing surface 27. When top and bottom borders 30, 32 are each eight feet in length, and side borders 34, 36 are four and one-half feet in length, masking fabric strips 38, 39 of one foot wide each reduce the effective viewing length of the top and bottom borders by two feet to a length of six feet. As a result, an exposed middle region of viewing surface 27 properly sized in the 3:4 format utilized with normal video projection format is obtained.

Referring now to FIG. 3, there is shown a masking apparatus of the present invention, generally designated 40, used to mask upper and lower regions of a projection screen. Masking apparatus 40 finds useful application in converting projection screen 10 from normal video projection format to high definition television format and is explained herein with reference to this use. It will be appreciated that masking apparatus 40 is not limited to such a use, as advantageous use of its masking capabilities in other situations is envisioned.

Projection screen 10 is illustrated squarely installed on a support structure or vertical rear wall 46 such that top border 12 is substantially horizontal. Masking apparatus 40 includes an upper cylindrical roller 42 coupled at one end to bracket 44 attached to vertical wall 46. The other end of roller 42 is operatively connected to an abstractly shown reversible electric motor 48, which is rigidly attached to wall 46. When energized, motor 48 can rotate or spin roller 42 in either angular direction. In a preferred construction, the motor for rotating roller 42 will be contained within roller 42, rather than the external motor shown. Alternatively, it is within the scope of the invention for upper roller 42 to be manually rotated.

Attached to roller 42 is an upper masking screen or fabric 50 sufficiently flexible to be windable around roller 42. Masking screen 50, which is preferably made of an opaque material suitable for framing an image projected on viewing surface 11, is wide enough to completely cover the entire width of projection screen 10 from side border 16 to side border 18. The bottom edge of upper masking screen 50 is provided with a rigid slat 52 along the entire masking screen width. Slat 52 aids in preventing small folds from forming within masking screen 50 during screen unwinding and winding cycles. As shown in FIG. 4, which is a cross-sectional side view taken along line 4—4 in FIG. 3, the lower portion and slat 52 of upper masking screen 50 hangs from the rearward face of upper roller 42. This configuration of upper masking screen 50 is a result of it being wound in a counter-clockwise wrapping direction, from the perspective of a FIG. 4 viewer, around roller 42. It will be appreciated that as upper roller 42 is rotated counter-clockwise by motor 48, upper masking screen 50 unwinds or unrolls from roller 42 under the force of gravity. For purposes of facilitating explanation, subsequent references within the application to clockwise and counter-clockwise are to be considered as taken from the perspective of a FIG. 4 viewer.

Roller 42 is horizontally mounted at top border 12 of projection screen 10 such that when upper masking screen 50 unwinds it descends to cover an upper region of viewing surface 11. While roller 42 may be mounted such that the bottom extent of the wound upper masking screen 50 is even with or slightly above top border 12, other roller elevations are within the scope of the present invention. While roller 42 is shown positioned forward, or more into the viewing room, than projection screen 10, and while upper masking screen 50 is shown unwinding from the rear of upper roller 42, these configurations are merely illustrative of the invention. For example, it is preferred to set roller 42 back above projection screen 10 and have screen 50 roll off the audience side of roller 42, i.e. wind upper masking screen 50 clockwise around roller 42. This preferred configuration occupies less depth than the illustrated embodiment.

Horizontally mounted at bottom border 14 of projection screen 10 is lower cylindrical roller 55. Roller 55 is connected at either end to brackets 57, which are attached to wall 46. Roller 55 is biased in a counter-clockwise direction by a rotation resisting torsional spring 59 (See FIG. 4), which is mounted within lower roller 55 and cooperates with a bracket 57 to provide a roller biasing force. A lower masking screen 61, constructed from the same material as upper masking screen 50, is windably attached to lower roller 55. The unrolled or outward edge of lower masking screen 61 is provided with a rigid slat 63, which preferably extends beyond the side-to-side width of lower masking screen 61. Rigid slat 63 prevents sagging of lower masking screen 61. While the entire vertically extendable length of lower masking screen 61 is shown extending the entire horizontal length of rigid slat 63, resulting in lower masking screen 61 generally being wider than upper masking screen 50, the primary masking portion of screen 61 only needs to be as wide as projection screen 10. As shown in FIG. 4, lower masking screen 61 is wound clockwise around lower roller 55, such that the outward screen edge with slat 63 points upward when extended from the rearward face of lower roller 55. In a preferred construction for use with the preferred set back upper roller referenced above, roller 55 may be set back below projection screen 10 and have masking screen 61 roll off the audience facing portion of the roller.

The preferred mechanism for operatively interconnecting motor 48 with lower masking screen 61, such that lower masking screen 61 is raised and lowered when upper roller 42 is rotated to raise and lower upper masking screen 50, includes reels or spools 65, 67 and straps 69, 71. Strap receiving reels 65, 67 are fixedly mounted on upper roller 42 so as to rotate therewith. One reel 65 is positioned along upper roller 42 proximate one end or side edge of wrapped upper masking screen 50, and the other reel 67 is similarly located beyond the other masking screen end. Straps 69, 71 are connected to reels 65, 67 and wrap around the reels in a clockwise fashion. The distal ends of straps 69, 71 are connected to rigid slat 63 of lower masking screen 61. In extending down from upper roller 42 toward lower masking screen 61, each strap 69, 71 is routed over a separate guide 73 attached to wall 46. As shown in FIG. 4, guides 73 lead the portions of straps 69, 71 just off upper roller 42 toward the plane of projection screen 10, such that substantially the entire downwardly extending lengths of straps. 69, 71 are parallel to projection screen 10. As used herein, straps 69, 71 include any of a variety of differently constructed cables, chains and other connectors which are capable of being wound.

Figure 5:
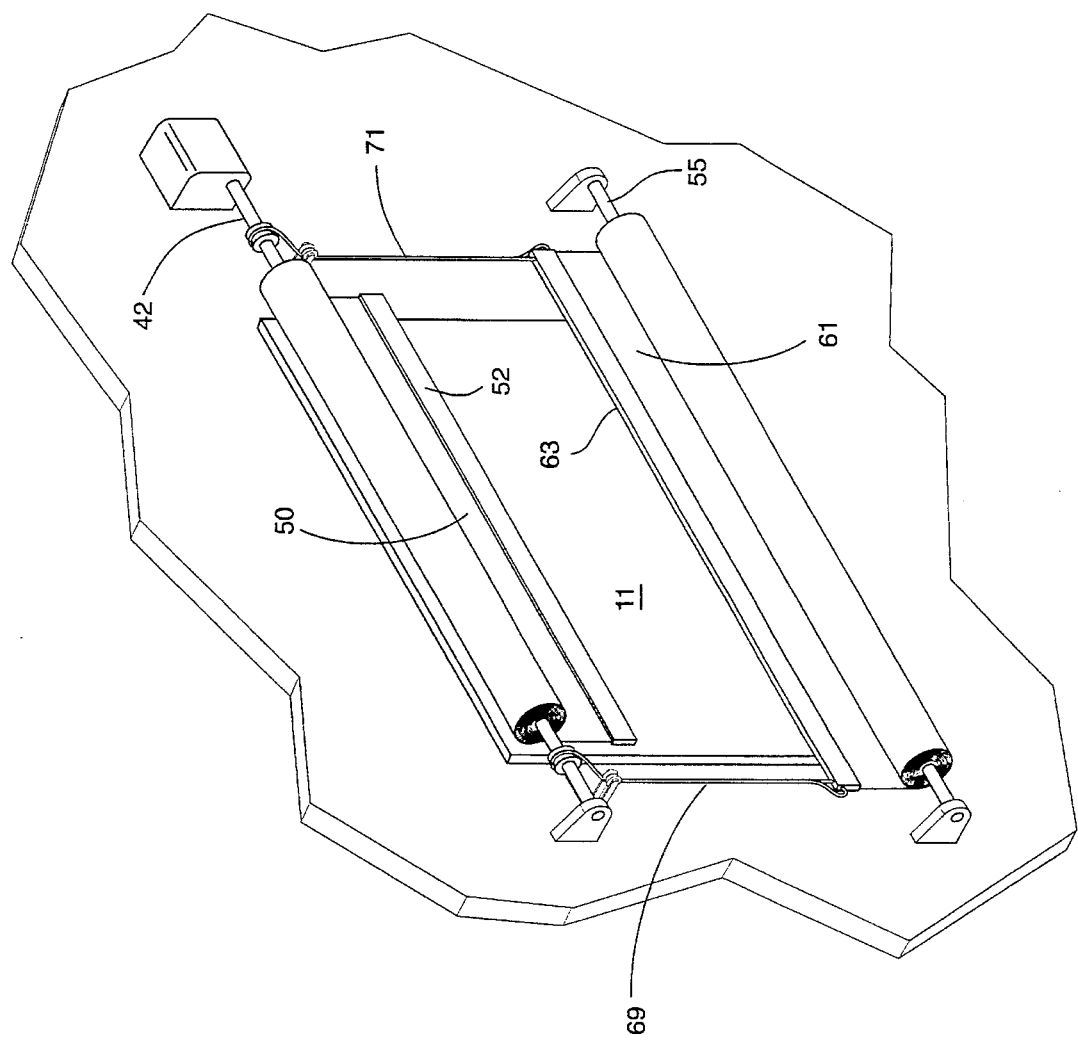
FIG. 5 is a perspective view of the masking apparatus of FIG. 3 after being moved to a masking or lowered alignment.

The construction of masking apparatus 40 will be further understood in view of the following explanation of its operation. When in its typical storage position or non-masking alignment, masking apparatus 40 is arranged over projection screen 10 as shown in FIG. 3. To convert screen 10 to HDTV format, reversible motor 48 is activated to rotate upper roller 42 counter-clockwise, which causes upper masking screen 50 to begin unwinding and descending under the force of gravity to cover the upper region of viewing surface 11. As upper roller 42 rotates counter-clockwise, strap receiving reels 65, 67 similarly and simultaneously rotate, thereby winding straps 69, 71 up around reels 65, 67. As straps 69, 71 are wound up, lower masking screen 61 is unwound from around lower roller 55 and raised to mask the lower region of viewing surface 11. The screen and strap wrapping directions described above, combined with guides 73, advantageously result in masking screens 50, 61 being in close proximity to viewing surface 11. It will also be appreciated that the rotation of lower roller 55 during this unwinding is resisted by torsional spring 59. The masking process is shown at an intermediate stage in FIG. 4. At the conclusion of the masking process, masking apparatus 40 is arranged in the masking alignment shown in FIG. 5, with the middle region of viewing surface 11 exposed for use.

The unmasking of the upper and lower regions of viewing screen 11 occurs in the following, conceptually similar manner. Motor 48 is reversed to effectively wind up upper masking screen 50 around roller 42, as well as unwind straps 69, 71 from around roller 42. As straps 69, 71 unwind, lower masking screen 61 winds back up around lower roller 55 due to the roller rotation provided by torsional spring 59.

To improve the aesthetics of masking apparatus 40, rollers 42, 55 and their respective masking screens can each be covered by a casing or box along their entire axial length. Vertically aligned boxes or channels extending between the roller boxes can be used to conceal straps 69, 71.

It will be appreciated that the particular methods of screen wrapping described above, as well as the axial mounting of reels 65, 67 directly on upper roller 42, result in an effective yet uncomplicated design. Other wrapping techniques, as well as different strap winding arrangements, are also within the scope of the invention.

Figure 6:
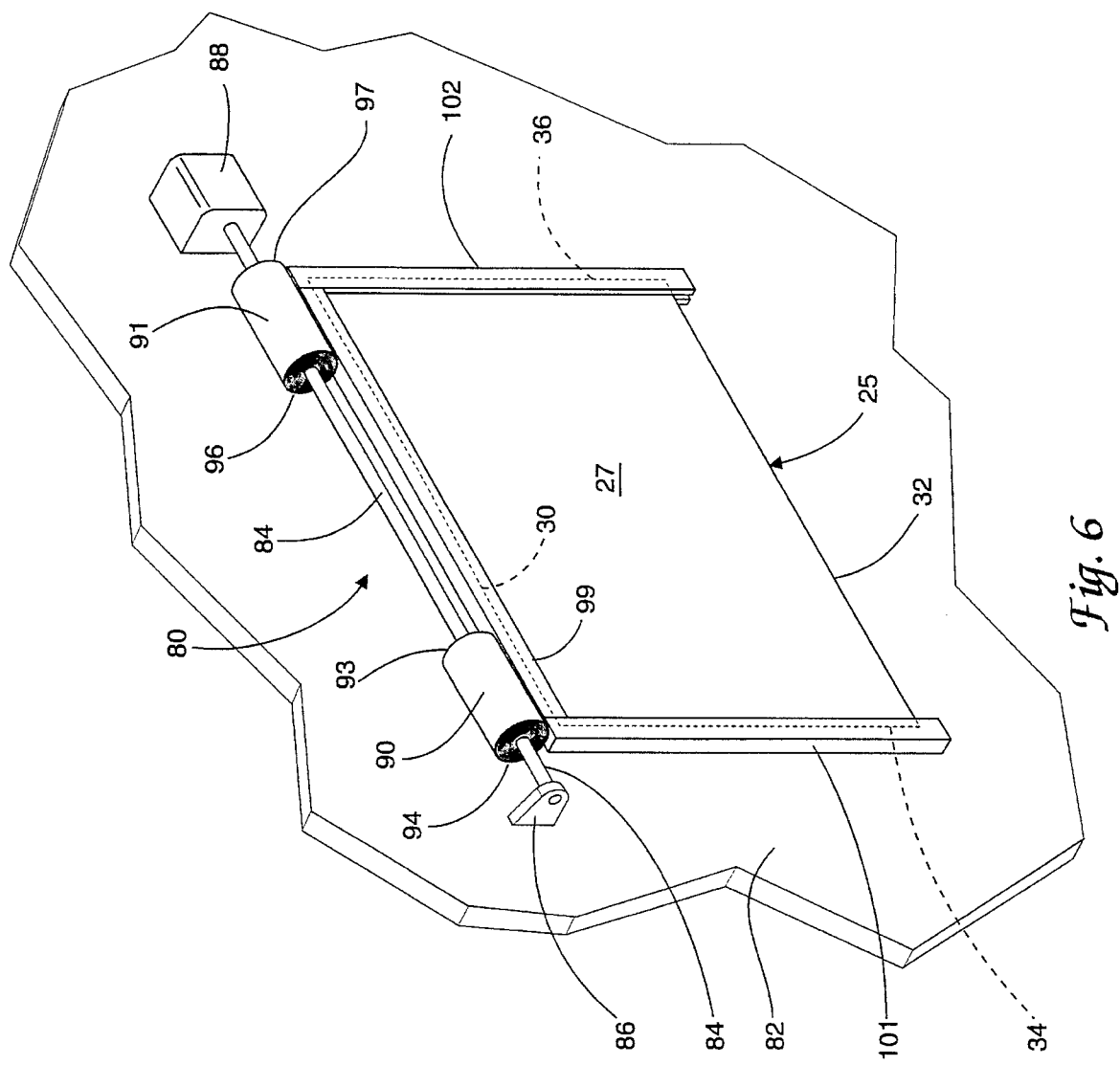
FIG. 6 is a perspective view of an embodiment of the masking apparatus of the present invention used to mask side regions of a shown projection screen, wherein the masking apparatus is shown in a non-masking alignment.
Figure 7:
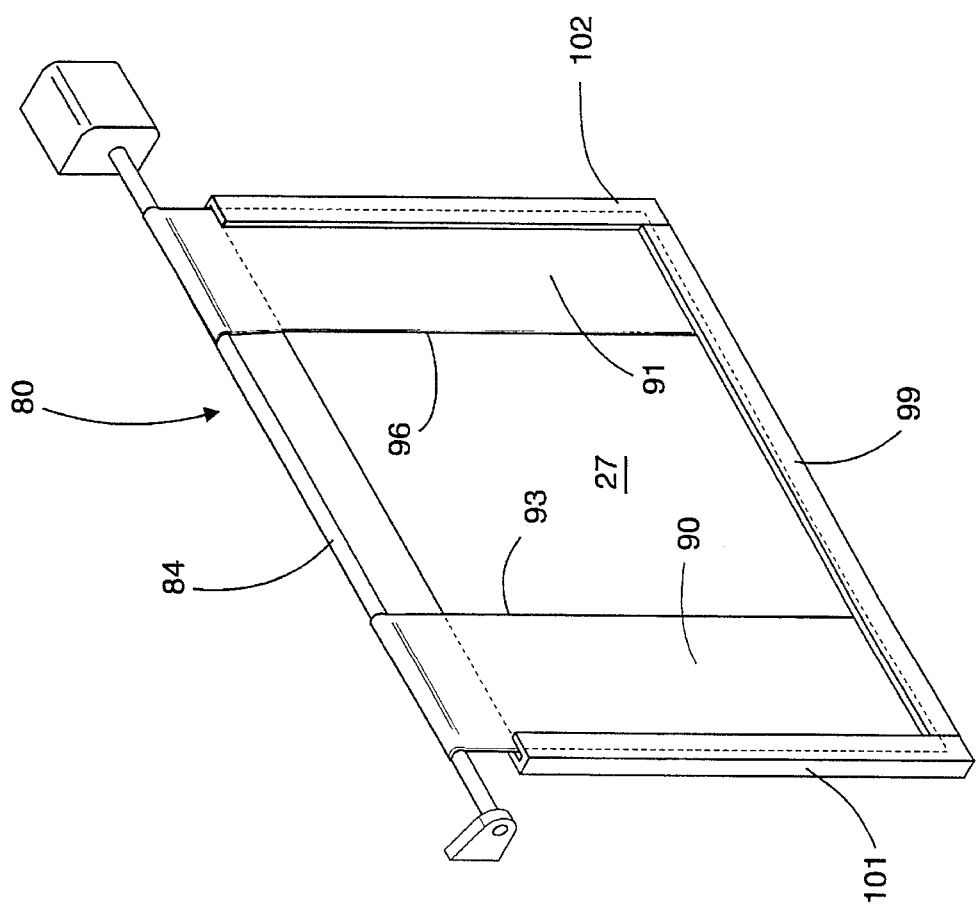
FIG. 7 is a perspective view of the masking apparatus of FIG. 6 after being moved to a masking alignment.

Referring now to FIGS. 6 and 7, there is shown an alternate embodiment of the present invention used to mask side regions of a projection screen. This alternate masking apparatus, generally designated 80, finds useful application in converting projection screen 25 from HDTV format to normal video projection format, but is not intended to be limited to such applications.

Projection screen 25 is illustrated installed on vertical rear wall 82 such that top border 30 is substantially horizontal. Masking apparatus 80 includes a horizontal cylindrical roller 84 mounted at projection screen top border 30. Roller 84 is coupled at one end to bracket 86, which is attached to vertical wall 82. The other roller end is operatively connected to an abstractly shown reversible electric motor 88, which is rigidly attached to wall 82. In a preferred construction, the motor is contained within roller 84 rather than being external as shown. Roller 84 can be rotated about its longitudinal axis in first and second opposite directions by motor 88, or alternatively by manual rotation.

Attached to separate sections of roller 84 are two side masking screens 90, 91. Screens 90, 91 may be made from the same material as the masking screens in the embodiment of FIGS. 3–5. Side masking screens 90, 91 are windable around roller 84 and are wrapped in a counter-clockwise direction. Consequently, masking screens 90, 91 hang downward from the rearward roller surface and in a close, spaced relationship with projection screen 25. Side masking screen 90 includes an inside edge 93 and an outside edge 94. Side masking screen 91 includes an inside edge 96, facing inside edge 93 of screen 90, and an outside edge 97. The space between facing screen inside edges 93, 96 is the desired width of the exposed screen when viewing surface 27 is partially masked. Outside edges 94, 97 preferably slightly overhang the side borders 34, 36 of projection screen 25. The bottom edge portions of masking screens 90, 91 are spanned by and connected to a rigid guide slat 99, which extends beyond the entire projection screen width.

Positioned on opposite sides of projection screen 25 are guide components 101, 102, which serve to guide the raising and lowering of side masking screens 90, 91. Guide components 101, 102 are attached to wall 82 and are vertically aligned along screen side borders 34, 36. Guide components 101, 102 include an interior channel in which the opposite ends of guide slat 99 insert and slide. The outside edges 94, 97 of screens 90, 91 also preferably extend laterally into the space defined by the component channels.

When in a storage position or non-masking alignment, masking apparatus 80 is arranged disposed above projection screen 25 as shown in FIG. 6. The opposing side ends of guide slat 99 reside within the guide channel of guide components 101, 102. To convert screen 25 to a normal video projection format, reversible motor 88 is energized to rotate roller 84 counter-clockwise, which causes side masking screens 90, 91 to begin unwinding and descending under the force of gravity. As side masking screens 90, 91 descend, the cooperative engagement of guide components 101, 102 with guide slat 99 keep masking screens 90, 91 in close proximity to viewing surface 27. Rotation of roller 84 is halted when masking screens 90, 91 have been lowered to mask or cover the side regions of viewing surface 27. At the conclusion of the side masking process, masking apparatus 80 is arranged in the masking alignment shown in FIG. 7, with the middle region of viewing surface 27 exposed for use. The unmasking of the viewing screen side regions is implemented by reversing motor 88 to wind up side masking screens 90, 91 back to the arrangement shown in FIG. 6. An appropriately sized roller casing can also be used with masking apparatus 80 to improve the aesthetics.

It will be appreciated that while a single, common roller is preferably employed for side masking screens 90, 91, other roller constructions are within the scope of the present invention. For example, separate roller components operatively linked together to be driven by motor 88 could alternatively be employed. In addition, in a preferred construction requiring less depth, roller 84 can be set back above projection screen 25 with masking screens 90, 91 rolling off the roller portion facing the audience.

While this invention has been described as having several alternate designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A masking apparatus for use with a projection screen having a viewing surface including an upper region, a middle region, and a lower region, the masking apparatus comprising:

an upper roller positioned above the viewing surface middle region;

an upper masking screen for masking the upper region of the viewing surface, said upper masking screen being windable around said upper roller;

means for rotating said upper roller in both a first direction to unwind said upper masking screen from around said upper roller to a masking alignment and in a second direction to wind said upper masking screen around said upper roller to a non-masking alignment;

a lower masking screen for masking the lower region of the viewing surface, said lower masking screen being raiseable to a masking alignment and lowerable to a non-masking alignment; and at least one connector means, operatively interconnecting said rotating means and said lower masking screen, for moving said lower masking screen when said upper roller is rotated, wherein said at least one connector means comprises a first strap and a second strap each coupled to said lower masking screen, wherein at opposite ends of said upper masking screen said first strap and said second strap are operatively attached to said upper roller, wherein said first and second straps wind around said upper roller when said upper roller rotates in said first direction, and wherein said first and second straps unwind from around said upper roller when said upper roller rotates in said second direction, whereby said lower masking screen moves toward said masking alignment when said upper roller rotates in said first direction, and whereby said lower masking screen moves toward said non-masking alignment when said upper roller rotates in said second direction.

2. The masking apparatus of claim 1 further comprising a lower roller positioned below the viewing surface middle region, wherein said lower masking screen is windable around said lower roller.

3. The masking apparatus of claim 2 wherein said lower roller is spring biased in a direction to wind said lower masking screen around said lower roller.

4. The masking apparatus of claim 1 wherein said at least one connector means comprises first and second strap receiving reels attached to said upper roller to be rotatable therewith, wherein said first strap and said second strap are windable around said first and second strap receiving reels respectively.

5. The masking apparatus of claim 1 further comprising a lower roller positioned below the screen viewing surface middle region, wherein said lower masking screen is windable around said lower roller.

6. A masking apparatus for use with a projection screen having a viewing surface including an upper region, a middle region, and a lower region, the masking apparatus comprising:

an upper roller positioned above the middle region;

an upper masking screen for masking the viewing surface upper region, said upper masking screen being windable around said upper roller in a first wrapping direction;

a lower roller positioned below the middle region;

a lower masking screen for masking the viewing surface lower region, said lower masking screen being windable around said lower roller;

at least one strap windable around said upper roller in a second wrapping direction, said at least one strap extending downwardly from said upper roller and operatively connected to said lower masking screen; and means for rotating said upper roller in a first direction and a second direction, wherein said upper masking screen unwinds from said upper roller and said at least one strap winds around said upper roller when said upper roller is rotated in said first direction, whereby said upper masking screen is lowered to mask the viewing surface upper region and said lower masking screen is raised to mask the viewing surface lower region, and wherein said upper masking screen winds around said upper roller and said at least one strap unwinds from around said upper roller when said upper roller is rotated in said second direction, whereby said upper masking screen is raised to unmask the viewing surface upper region and said lower masking screen is lowered to unmask the viewing surface lower region.

7. The masking apparatus of claim 6 further comprising first and second strap receiving reels connected to said upper roller and disposed at opposite ends of said upper masking screen, said at least one strap comprising a first strap attached to said first strap receiving reel and a second strap attached to said second strap receiving reel.

8. The masking apparatus of claim 6 wherein said lower roller is spring biased in a direction to wind said lower masking screen around said lower roller.

9. The masking apparatus of claim 6 wherein said lower masking screen is windable around said lower roller in said second wrapping direction.

10. The masking apparatus of claim 6 further comprising at least one guide for guiding said at least one strap toward a plane of the projection screen.

11. A masking apparatus for use with a projection screen having a viewing surface including a middle region and opposing side regions, the masking apparatus comprising:

an upper roller means;

a first side masking screen for masking one viewing surface side region, said first side masking screen being windable around said upper roller means;

a second side masking screen for masking the other viewing surface side region, said second side masking screen being windable around said upper roller means;

means for rotating said upper roller means in a first direction and a second direction, wherein said first side masking screen and said second side masking screen unwind from said upper roller means when said upper roller means is rotated in said first direction, whereby said first side masking screen and said second side masking screen are lowered to mask the viewing surface side regions, and wherein said first side masking screen and said second side masking screen wind around said upper roller means when said upper roller means is rotated in said second direction, whereby said first side masking screen and said second side masking screen are raised to unmask the viewing surface side regions.

12. The masking apparatus of claim 11 wherein said first side masking screen and said second side masking screen each comprise a bottom edge portion, and wherein the masking apparatus further comprises a guide slat connected to said side masking screen bottom edge portions.

13. The masking apparatus of claim 12 further comprising first and second guide channels positioned at opposite sides of the projection screen, said first and second guide channels structured to cooperate with opposite ends of said guide slat to guide the raising and lowering of said first and second side masking screens.

* * * * *